United States Patent Office 3,397,274
Patented Aug. 13, 1968

3,397,274
METHOD FOR THE CONTROL OF FUNGI
James Wellington Clapp, Princeton, N.J., assignor to American Cyanamid Company, Stamford, Conn., a corporation of Maine
No Drawing. Original application Nov. 10, 1964, Ser. No. 410,269. Divided and this application Feb. 1, 1967, Ser. No. 613,088
6 Claims. (Cl. 424—316)

ABSTRACT OF THE DISCLOSURE

The present invention relates to a novel method for the control of fungi utilizing a guanidine represented by the formula:

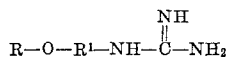

and the acid addition salts thereof wherein R is an alkyl substituent containing from 8 to 18 carbon atoms and $R^1$ is an alkyl radical containing from 3 to 4 carbon atoms.

This application is a divisional of my copending application, Ser. No. 410,269, filed on Nov. 10, 1964, now abandoned.

BACKGROUND OF THE INVENTION

The defined guanidines are characterized as white solids, the free bases being strongly alkaline and possessing low solubility in water, while their salts are more nearly neutral and have varying degrees of water solubility. Since the salts are generally more readily isolated and more easily handled than the free bases, they are often preferred for incorporation into a variety of compositions suitable for application. In French Patent No. 788,439, the broadly defined compounds hereinabove are said to be bactericidal. However, the patent is devoid of any teaching or suggestion as to any other utility possessed by the defined compound.

SUMMARY OF THE INVENTION

The present invention is directed to the control of fungi which, in general, comprises the application to an area to be protected from fungi an effective toxic amount of a compound of the formula:

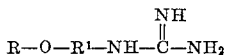

and acid addition salts thereof, wherein R represents an alkyl group from 8 to 18 carbon atoms and $R^1$ is defined as either trimethylene or tetramethylene.

BRIEF DESCRIPTION OF THE PREFERRED EMBODIMENTS

In general, the effective guanidine fungicides falling within the purview of the invention are prepared by reacting an appropriate amine with cyanamide in the presence of sufficient acid so that the pH of the reaction mixture is maintained between about 8 and about 10. Advantageously, equimolar amounts of the appropriate amine and cyanamide at temperatures ranging from about 85° C. to about 105° C. for a period from about fifteen minutes to about five hours are employed. For optimum operation, a mole excess of the cyanamide, usually not more than about 10%, can be employed to obtain improved yields of the desired guanidine. Illustrative guanidine compounds so prepared are: [3-(octyloxy)propyl]guanidine, [3-(octyloxy)-propyl]guanidine bicarbonate, [3-(octyloxy)propyl] guanidine acetate, [3-(octyloxy)propyl]guanidine sulfate, [3-(decyloxy)-propyl]guanidine acetate, [4-(octyloxy) butyl]guanidine acetate, and [3-(2-ethylhexyloxy)propyl] guanidine acetate.

The acid addition salts of the respective guanidines are prepared by reacting the resultant guanidine with either an organic or inorganic acid, such as sulfuric acid, nitric acid, acetic acid, propionic acid or phthalic acid. However, some guanidine acid addition salts can also be converted to other acid addition salts, such as the conversion of an acetate to a carbonate by adding sodium carbonate solution to an aqueous solution of the acetate salt, or a carbonate to a sulfate by adding sulfuric acid to the carbonate salt and collecting the precipitated product. Of course, free bases of the substituted guanidines can be readily prepared from their salts by, for example, dissolving the salts in an aqueous solvent, such as 1:1 isopropanol-water, and treating the solution with a suitable ion-exchange resin to replace the anions by hydroxyl ions to form water and then separating the remaining solution and evaporating to dryness.

To further illustrate the invention, the following examples are presented by way of illustration. They are not to be construed as limitative thereof and the parts given are by weight.

Example 1.—Preparation of [3-(octyloxy)propyl] guanidine bicarbonate

To a suitable reaction vessel containing 37.5 parts of 3-(octyloxy)propylamine are added 6.7 parts of glacial acetic acid. The mixture is warmed to a temperature of about 90° C. A 25% aqueous cyanamide solution (57.2 parts by volume) and 3.7 parts of glacial acetic acid are next added simultaneously with continuous stirring over a period of 1 hour. The temperature of the reaction mixture during addition is maintained at between 94° C. and 96° C. Upon completion of the addition of the latter, resultant solution is stirred at between 94° C. and 96° C. for an additional 3 hours. Thereafter, the contents of the vessel are cooled to room temperature and treated with sodium carbonate solution prepared by dissolving 22.2 parts of sodium carbonate in 50 parts of water. Resultant precipitate is collected and separated from the reaction vessel by filtration. A white solid salt is washed with water and then with acetone and finally dried. 35 parts of [3-(octyloxy)propyl]guanidine bicarbonate which represents a 60.2% yield is obtained having a melting point between 115° C. and 117° C. Two recrystallizations from ethanol provide an analytically pure product having a melting point between 116° C. and 118° C. Upon analysis, the following data is established in percent:

Calcd. for $C_{13}H_{29}N_3O_4$: C, 53.58; H, 10.03; N, 14.42.
Found: C, 54.17; H, 10.27; N, 14.52.

Example 2.—Preparation of [3-(octyloxy)propyl] guanidine acetate 10 parts of [3-(octyloxy)propyl]guanidine bicarbonate prepared in Example 1 above are suspended in 25 parts of water and 4 parts (by volume) of glacial acetic acid. Resultant mixture is concentrated in vacuo to a viscous liquid that solidifies at room temperature. 6.4 parts by weight of resultant substituted guanidine acetate amounting to a 68.2% yield is obtained. The acetate melts at between 63° C. and 65° C. After four recrystallizations from acetone, a pure product having a melting point of about 68° C. to 69° C. is obtained. On analysis, the following in percent is recorded.

Calcd. for $C_{14}H_{31}N_3O_3$: C, 58.10; H, 10.80; N, 14.52.
Found: C, 58.10; H, 10.67; N, 15.36.

Example 3.—Preparation of [3-(decyloxy)propyl]- guanidine carbonate

In a suitable reaction vessel containing 40.0 parts of 3-(decyloxy)propylamine are added 6.5 parts of glacial acetic acid. The temperature of the mixture is increased to 94° C. Thereafter, 57 parts of a 25% aqueous cyanamide solution and 3.5 parts of glacial acetic acid are added simultaneously with stirring over a period of 1 hour, while maintaining the temperature at 94° C.–96° C. The viscous mixture is heated at 94° C.–96° C. for an addiitonal 3 hours, then cooled to room temperature and the semi-solid treated with 19.2 parts of sodium carbonate in fifty parts of water. The precipitate formed is fitered and thoroughly washed with water and then with acetone. After drying in an oven, the weight of the guanidine salt is 40.8 parts representing a yield of 74.6% of theoretical. Its melting point is about 120° C. After four recrystallizations from ethanol, there is obtained analytically pure product having a melting point of 140° C. On analysis, the following is found in percent:

Calcd. for $C_{29}H_{64}N_6O_5$: C, 60.38; H, 11.18; N, 14.57. Found: C, 60.04; H, 11.20; N, 14.82.

Example 4.—Preparation of [3-(decyloxy)propyl]-guanidine acetate

The conversion of the guanidine carbonate as prepared in Example 3 above to the corresponding acetate is accomplished by means of glacial acetic acid addition thereto at 60° C. Two parts of the acetic acid are added to 10 parts of the carbonate in twenty-five parts of water and the mixture is then stirred at 50° C.–60° C. for 15 minutes. It is next concentrated in vacuo and the resulting white solid is dried and recrystallized once from ether to recover 5.03 parts of a white solid whose melting point is between 75° C.–77° C. Recrystallizations from acetone afford colorless needles of melting point equal to 80° C.–81° C. On analysis, the following is recorded in percent:

Calcd. for $C_{16}H_{35}N_3O_3$: C, 60.53; H, 11.11; N, 13.24. Found: C, 60.97; H, 11.09; N, 13.24.

Example 5.—Preparation of [4-(octyloxy)butyl]-guanidine acetate

A mixture of 15.5 parts of 4-(octyloxy)butylamine and 4.2 parts of glacial acetic acid is stirred and heated at 95° C.–100° C., with protection from atmospheric moisture during the addition of 4.2 parts of anhydrous cyanamide over 200 minutes. Heating at 100° C. while stirring is continued for 70 minutes more. Cooling gives the desired product as a white, crystalline solid which is washed with acetone and dried. A yield of 18.7 parts is obtained. The product after two recrystallizations from ethanol melts at 85° C.–88° C. and on analysis, the following is found in percent:

Calcd. for $C_{15}H_{33}N_3O_3$: C, 59.36; H, 10.96; N, 13.85. Found: C, 59.11; H, 10.81; N, 13.84.

In this example, the 4-(octyloxy)butylamine is prepared by initially reacting sodium octoxide in octanol with 1,4-dibromobutane to form 4-bromobutyl octyl ether, then reacting the latter with potassium phthalimide to form N-[4-(octyloxy)butyl]phthalimide and, finally, cleaving this phthalimide with hydrazine to form the desired amine.

In order to establish the efficacy of the foregoing guanidine compounds, the examples below illustrate the microbiological activity of the compounds contemplated by the present invention.

Example 6

For the following test, agar plates are prepared by measuring twenty ml. of sterile mineral salts agar into sterile petri dishes and admixing therewith a sufficient quantity of solution containing test compound to provide 25, 50, 100 or 250 p.p.m. of compound in the mixture. The mixtures are then permitted to solidify and are inoculated on the surface with one drop of each inoculum prepared by suspending spores and mycelium from cultures of *Aspergillus niger, Fusarium moniliforme, Penicillium citrinum, Pullularia pullulans, Pythium deBaryanum* and *Rhizoctonia solani* in sterile deionized water. After inoculation, the plates are covered and incubated at 23° C. for 72 hours. Results are observed and recorded as least concentration in p.p.m. to inhibit growth. Results of tests with the compounds of the instant invention are provided in Table I below.

TABLE I.—FUNGI INHIBITION TESTS

| Compound | Least Concentration to Inhibit— | | | | | |
|---|---|---|---|---|---|---|
| | A. niger | F. moniliforme | P. citrinum | P. pullulans | Py. deBaryanum | R. solani |
| [3-(Octyloxy)propyl]guanidine bicarbonate | 25 | 25 | 25 | 25 | 25 | 250 |
| [3-(Octyloxy)propyl]guanidine acetate | 25 | 25 | 50 | 25 | 25 | >250 |
| [3-(Decyloxy)propyl]guanidine carbonate | 25 | 100 | 100 | 50 | 25 | 25 |
| [3-(Decyloxy)propyl]guanidine acetate | >250 | >250 | 100 | 50 | 50 | 50 |
| [4-(Octyloxy)butyl]guanidine acetate | 25 | 100 | 100 | | 25 | 25 |

Example 7

To determine the efficacy of the compounds of the invention against the disease organism, *Venturia inaequalis*, responsible for apple scab, apple seedlings are thoroughly sprayed with aqueous or aqueous-acetone solutions containing ¼, ½ or 1 pound of test compound per 100 gallons of solution. After spraying, the seedlings are permitted to dry and then inoculated with *V. inaequalis*. The inoculum is prepared in tap water and contains approximately 100,000 conidia per ml. obtained from freshly sporulating lesions. Inoculation of the treated seedlings is accomplished by atomizing the inoculum uniformly on to the foilage. Following inoculation, the seedlings are placed in humidity cabinets maintained at about 70° F. and 100% relative humidity for 14 days. On termination of the incubation period, the seedlings are removed from the cabinets and examined for lesions. Results of the instant tests appear in Table II below.

TABLE II.—APPLE SCAB

| Compound | Number of lesions (3 tree reps.) At rates of— | | |
|---|---|---|---|
| | 1 lb./ 100 gal. | ½ lb./ 100 gal. | ¼ lb./ 100 gal. |
| n-$C_8H_{17}$—O—$(CH_2)_3$—NH—C(=NH)—$NH_2 \cdot H_2CO_3$ | 0 | 1 | 4 |
| n-$C_8H_{17}$—O—$(CH_2)_3$—NH—C(=NH)—$NH_2 \cdot CH_3COOH$ | 0 | 5 | 16 |
| n-$C_{10}H_{21}$—O—$(CH_2)_3$—NH—C(=NH)—$NH_2 \cdot \tfrac{1}{2}H_2CO_3$ | 0 | 0 | 22 |
| n-$C_{10}H_{21}$—O—$(CH_2)_3$—NH—C(=NH)—$NH_2 \cdot CH_3COOH$ | 4 | 4 | [1] 10 |

[1] 2 trees only.

Advantageously, the compounds of the invention can be formulated as a dust or spray by methods known in the art. For instance, dusts are readily prepared by admixing from 5% to 25% by weight of the active compound with an inert powder carrier, such attaclay, pumice, kaolin, fuller's earth or talc. Sprays can be made up as emulsifiable concentrates or wettable powders which are dispersed in water prior to application. Emulsifiable concentrates are prepared by dissolving the active material in an organic solvent, such as lower alcohols exemplified by isopropanol, or butanol and ketones, such as methyl-ethyl ketone and thereafter adding to the latter mixture a small amount, within the range of 2% to 5% based on the weight of the mixture, an emulsifying or dispersing agent which is commercially available. These include, for instance, the salts of alkylaryl sulfonic acids, the fatty acid esters of polyhydric alcohols, the sodium salt of polymerized propyl naphthalene sulfonic acid and equivalents thereof.

I claim:
1. A method of controlling fungi which comprises contacting said fungi with a fungicidally effective amount of a compound selected from the group consisting of a compound of the formula:

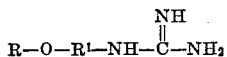

and the acid addition salts thereof, wherein R is alkyl of from 8 to 18 carbon atoms and $R^1$ is alkyl of from 3 to carbon atoms.

2. The method according to claim 1 wherein the compound is: [3-(octyloxy)propyl]guanidine bicarbonate.
3. The method according to claim 1 wherein the compound is: [3-(octyloxy)propyl]guanidine acetate.
4. The method according to claim 1 wherein the compound is: [3-(decyloxy)propyl]guanidine carbonate.
5. The method according to claim 1 wherein the compound is: [3-(decyloxy)propyl]guanidine acetate.
6. The method according to claim 1 wherein the compound is: [3-(octyloxy)propyl]guanidine.

References Cited

FOREIGN PATENTS 788,429   10/1935   France.

OTHER REFERENCES

Stedman's Medical Dictionary, 21st ed., 1966, Williar & Wilkens Co., Baltimore, Md., p. 181, 639.

ALBERT T. MEYERS, *Primary Examiner.*
R. S. DORCAS, *Assistant Examiner.*